US008792394B2

(12) United States Patent
Nagara

(10) Patent No.: US 8,792,394 B2
(45) Date of Patent: Jul. 29, 2014

(54) WIRELESS COMMUNICATION APPARATUS, PROGRAM, WIRELESS COMMUNICATION METHOD, AND WIRELESS COMMUNICATION SYSTEM

(75) Inventor: Toru Nagara, Tokyo (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 13/211,489

(22) Filed: Aug. 17, 2011

(65) Prior Publication Data

US 2012/0051244 A1    Mar. 1, 2012

(30) Foreign Application Priority Data

Aug. 24, 2010  (JP) ............................... P2010-187369

(51) Int. Cl.
*H04W 24/10*  (2009.01)

(52) U.S. Cl.
USPC ........... 370/272; 370/327; 370/328; 370/329; 370/331; 370/445

(58) Field of Classification Search
USPC ....................................................... 370/327
See application file for complete search history.

(56) References Cited

U.S. PATENT DOCUMENTS

| | | | | |
|---|---|---|---|---|
| 6,407,779 B1* | 6/2002 | Herz | ............................... | 348/734 |
| 7,403,512 B2* | 7/2008 | Tsai et al. | ....................... | 370/338 |
| 7,430,435 B2* | 9/2008 | Choi et al. | ....................... | 455/522 |
| 7,515,548 B2* | 4/2009 | Chandra et al. | ................ | 370/252 |
| 7,536,015 B2* | 5/2009 | Eguchi | ........................... | 380/270 |
| 7,580,393 B2* | 8/2009 | Wang et al. | .................... | 370/332 |
| 7,627,319 B2* | 12/2009 | Sato | ............................... | 455/437 |
| 7,768,963 B2* | 8/2010 | Alizadeh-Shabdiz | ........ | 370/328 |
| 7,899,006 B2* | 3/2011 | Boyd | ............................... | 370/328 |
| 7,969,937 B2* | 6/2011 | Iyer et al. | ....................... | 370/329 |
| 8,265,017 B2* | 9/2012 | Robinson et al. | ............. | 370/329 |
| 8,270,905 B1* | 9/2012 | Cahill et al. | ................ | 455/67.11 |
| 8,315,233 B2* | 11/2012 | Alizadeh-Shabdiz | ........ | 370/338 |
| 8,340,614 B2* | 12/2012 | Rosener et al. | ............ | 455/226.2 |
| 8,345,881 B2* | 1/2013 | Rekimoto | ....................... | 380/282 |
| 8,385,823 B2* | 2/2013 | Naniyat | ....................... | 455/41.1 |
| 2003/0206531 A1* | 11/2003 | Shpak | ............................... | 370/320 |
| 2004/0205246 A1* | 10/2004 | Park | ............................... | 709/245 |
| 2005/0117750 A1 | 6/2005 | Rekimoto | | |
| 2005/0125682 A1 | 6/2005 | Eguchi | | |
| 2005/0143119 A1* | 6/2005 | Chandra et al. | ............... | 455/522 |

(Continued)

FOREIGN PATENT DOCUMENTS

| | | |
|---|---|---|
| JP | 2005-136897 A | 5/2005 |
| JP | 4307227 | 8/2009 |

OTHER PUBLICATIONS

Extended European Search Report Application No. EP 11175936, dated Nov. 9, 2011.

*Primary Examiner* — Ian N Moore
*Assistant Examiner* — Lakeram Jangbahadur
(74) *Attorney, Agent, or Firm* — Sony Corporation

(57) ABSTRACT

A wireless communication apparatus includes a receiving unit configured to receive a response request signal, a transmitting unit configured to transmit a response signal in response to the response request signal, a measuring unit configured to continuously measure received power of the response request signal received by the receiving unit, and a communication control unit configured to cause the transmitting unit to transmit the response signal to a wireless communication apparatus that has transmitted the response request signal if the received power of the response request signal is higher than a threshold value.

14 Claims, 13 Drawing Sheets

(56) References Cited

U.S. PATENT DOCUMENTS

| | | |
|---|---|---|
| 2005/0213579 A1 | 9/2005 | Iyer et al. |
| 2006/0203856 A1* | 9/2006 | Laroia et al. ............... 370/522 |
| 2007/0197246 A1* | 8/2007 | Julian ........................ 455/515 |
| 2008/0080387 A1 | 4/2008 | Wang et al. |
| 2008/0080388 A1* | 4/2008 | Dean et al. ................. 370/252 |
| 2008/0119237 A1* | 5/2008 | Kim ............................ 455/566 |
| 2010/0091669 A1* | 4/2010 | Liu et al. .................... 370/252 |
| 2011/0075589 A1* | 3/2011 | Bradley et al. ............. 370/254 |
| 2011/0149806 A1* | 6/2011 | Verma et al. ............... 370/255 |
| 2011/0170481 A1* | 7/2011 | Gomes et al. .............. 370/328 |
| 2011/0207500 A1* | 8/2011 | Nakamura et al. ......... 455/522 |
| 2011/0309933 A1* | 12/2011 | Marino .................... 340/539.32 |
| 2012/0213159 A1* | 8/2012 | Iyer et al. ................... 370/328 |
| 2012/0224549 A1* | 9/2012 | Myers et al. ............... 370/329 |
| 2012/0243524 A1* | 9/2012 | Verma et al. ............... 370/338 |
| 2012/0309420 A1* | 12/2012 | Morgan et al. ............. 455/456.1 |
| 2013/0029686 A1* | 1/2013 | Moshfeghi ................. 455/456.1 |
| 2013/0030931 A1* | 1/2013 | Moshfeghi ................. 705/16 |

\* cited by examiner

WIRELESS COMMUNICATION APPARATUS, PROGRAM, WIRELESS COMMUNICATION METHOD, AND WIRELESS COMMUNICATION SYSTEM

CROSS-REFERENCE TO RELATED APPLICATION

The present application claims priority from Japanese Patent Application No. JP 2010-187369 filed in the Japanese Patent Office on Aug. 24, 2010, the entire content of which is incorporated herein by reference.

BACKGROUND

The present disclosure relates to a wireless communication apparatus, a program, a wireless communication method, and a wireless communication system.

In recent years, wireless local area network (LAN) systems (e.g., IEEE (Institute of Electrical and Electronics Engineers) 802.11) have been in widespread use in order to replace wired networks, since the devices of wireless LAN systems can be used at a variety of places. For example, as described in Japanese Patent No. 4307227, a wireless LAN system that complies with the IEEE 802.11 standard is formed from a group of wireless communication apparatuses including an access point that serves as a parent node and a plurality of stations that serve as child nodes. The plurality of stations are connected to a single access point.

In addition, the Wi-Fi Alliance promotes a specification called Wi-Fi Direct. In Wi-Fi Direct, a plurality of wireless communication apparatuses detect each other (Device Discovery, Service Discovery) and perform device authentication in WPS (Wi-Fi Protected Setup). In this way, the wireless communication apparatuses establish a direct connection with each other. Furthermore, in Wi-Fi Direct, a plurality of wireless communication apparatuses determine which one will serve as a parent node (Group Owner) or a child node (Client) and, thereafter, form a communication group. Note that such a technique for wireless communication apparatuses directly communicating with each another without using an access point is described in, for example, Japanese Patent No. 4307227 and Japanese Unexamined Patent Application Publication No. 2005-136897.

SUMMARY

However, since the transmission distance range of a Wi-Fi wave is long, a wireless communication apparatus may detect a plurality of other wireless communication apparatuses. Therefore, the wireless communication apparatus can display a selection screen displaying the detected wireless communication apparatuses as candidates to which the wireless communication apparatus may be connected, and a user can select one of the wireless communication apparatuses. However, in such a technique, several problems arise. For example, it is troublesome for the user to select a target wireless communication apparatus in the selection screen displaying a plurality of candidate wireless communication apparatuses.

In addition, if a wireless communication apparatus of a user A detects a wireless communication apparatus located in the next room (or a neighboring house), it is difficult to determine whether the detected wireless communication apparatus is located in the next room. Thus, the wireless communication apparatus of the user A displays the wireless communication apparatus located in the next room as a candidate, and the user A may select the displayed wireless communication apparatus by mistake. In such a case, the wireless communication apparatus located in the next room displays a connection confirmation screen. However, if a user B of the wireless communication apparatus located in the next room operates the wireless communication apparatus and allows a connection to be made by mistake, connection between the two wireless communication apparatuses is established by mistake.

Furthermore, a problem of a connection confirmation screen being displayed on the wireless communication apparatus located in the next room by mistake arises. For example, even when the user B in the next room rejects the connection, the user A may repeatedly attempt to make a connection if the user A is not aware that they are selecting the wireless communication apparatus in the next room. Accordingly, a connection confirmation screen may repeatedly appear on the wireless communication apparatus located in the next room.

To solve such a problem, it can be determined whether the nearby wireless communication apparatus detected by the wireless communication apparatus of the user A is located in the room of the user A or in the vicinity of the user A using the received power (the received signal strength indication (RSSI)) of a wireless signal transmitted from a nearby wireless communication apparatus. However, the received power does not monotonically vary in accordance with the distance between wireless communication apparatuses. For this reason, it is difficult to identify the positional relationship between the wireless communication apparatuses using the received power.

The present disclosure provides a novel and improved wireless communication apparatus, a program, a wireless communication method, and a wireless communication system capable of properly identifying a target wireless communication apparatus.

According to an embodiment of the present disclosure, a wireless communication apparatus includes a receiving unit configured to receive a response request signal, a transmitting unit configured to transmit a response signal in response to the response request signal, a measuring unit configured to continuously measure received power of the response request signal received by the receiving unit, and a communication control unit configured to cause the transmitting unit to transmit the response signal to a wireless communication apparatus that has transmitted the response request signal if the received power of the response request signal is higher than a threshold value.

In the case where the receiving unit receives the response request signal from each of a plurality of wireless communication apparatuses, if the received power of the response request signal transmitted from one of the wireless communication apparatuses is higher than a threshold value and a difference between the received power of the response request signal and the received power of each of the response request signals transmitted from the other wireless communication apparatuses is larger than a setting value, the communication control unit can cause the transmitting unit to transmit the response signal to the one of the wireless communication apparatus.

The communication control unit can further cause the transmitting unit to transmit the response signal after the received power of the response request signal has fallen below the threshold value.

If the received power of the response request signal is on the increase and exceeds the threshold value and if the received power of the response request signal is on the decrease and falls below the threshold value, the communication control unit can cause the transmitting unit to transmit the response signal.

The wireless communication apparatus can further include a notifying unit. The communication control unit can control communication for establishing a connection with the wireless communication apparatus that has transmitted the response request signal after the transmitting unit has transmitted the response signal, and when the establishment performed by the communication control unit is completed, the notifying unit notifies the establishment of communication.

The wireless communication apparatus can further include a display unit configured to display a screen for asking a user whether establishment of a connection is allowed before the communication control unit starts communication for establishing a connection.

The communication control unit can control transmission of the response signal on the basis of the received power of the response request signal subjected to an averaging process.

According to another embodiment of the present disclosure, a program includes program code for causing a computer to function as a receiving unit configured to receive a response request signal, a transmitting unit configured to transmit a response signal in response to the response request signal, a measuring unit configured to continuously measure received power of the response request signal received by the receiving unit, and a communication control unit configured to cause the transmitting unit to transmit the response signal to a wireless communication apparatus that has transmitted the response request signal if the received power of the response request signal is higher than a threshold value.

According to still another embodiment of the present disclosure, a wireless communication method includes receiving a response request signal, continuously measuring received power of the response request signal, and transmitting a response signal to a wireless communication apparatus that has transmitted the response request signal if the received power of the response request signal is higher than a threshold value.

According to yet still another embodiment of the present disclosure, a wireless communication system includes a first wireless communication apparatus configured to intermittently transmit a response request signal and a second wireless communication apparatus. The second wireless communication apparatus includes a receiving unit configured to receive the response request signal, a transmitting unit configured to transmit a response signal in response to the response request signal, a measuring unit configured to continuously measure received power of the response request signal received by the receiving unit, and a communication control unit configured to cause the transmitting unit to transmit the response signal to the wireless communication apparatus that has transmitted the response request signal if the received power of the response request signal is higher than a threshold value.

As described above, according to the embodiments of the present disclosure, a wireless communication apparatus that is a target of communication can be correctly determined.

DETAILED DESCRIPTION OF EMBODIMENTS

Figure 1:
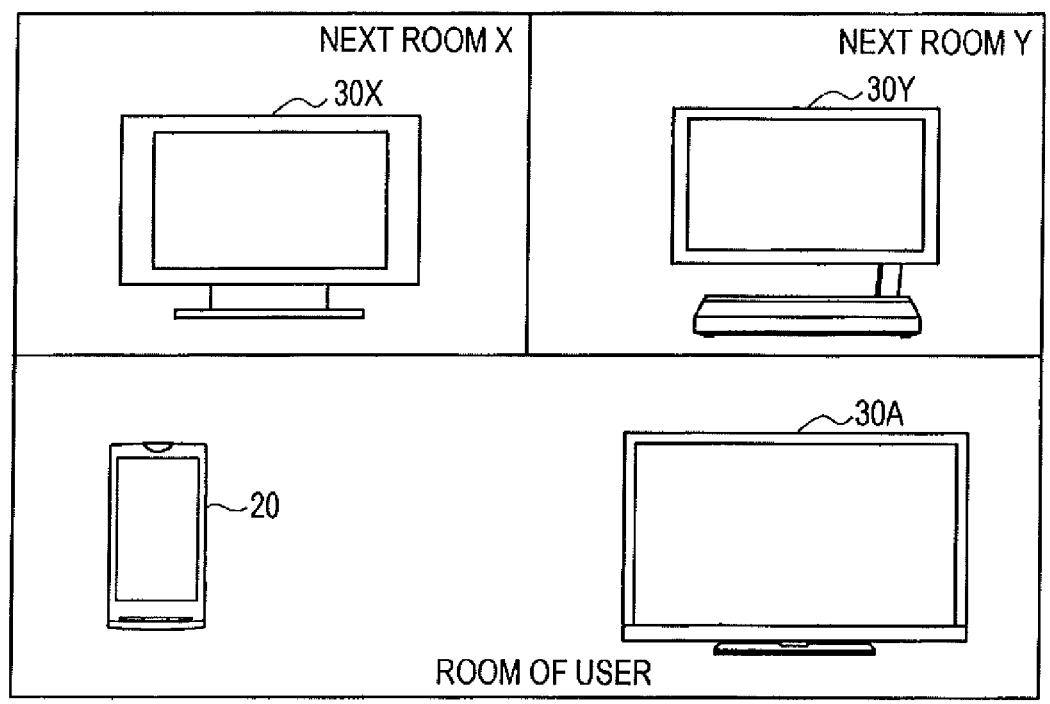
FIG. 1 illustrates an exemplary configuration of a wireless communication system according to an embodiment of the present disclosure.

Exemplary embodiments of the present disclosure are described below with reference to the accompanying drawings. Note that in the following description and the drawings, the same numbering will be used in describing components having substantially the same functional structure and, thus, descriptions thereof are not repeated.

Alternatively, a plurality of components having substantially the same functional structure may be distinguished from one another by appending an alphabetic letter to the same reference numeral. A plurality of components having substantially the same functional structure may be referred to as, for example, "display apparatuses 30A, 30X, and 30Y". However, when distinction among a plurality of components having substantially the same functional structure is not necessary, the same reference symbol is given to the components. For example, when distinction among "display apparatuses 30A, 30X, and 30Y" is not necessary, the display apparatuses are simply referred to as display apparatuses 30.

The exemplary embodiments of the present disclosure are described in the following order:

1. Configuration of Wireless Communication System
2. Configuration of Cell Phone and Display Apparatus according to Embodiment of Present Disclosure
3. Operation Performed by Wireless Communication System according to Embodiment of Present Disclosure
   3-1. First Example of Operation
   3-2. Second Example of Operation
4. Summary 1. Configuration of Wireless Communication System An exemplary configuration of a wireless communication system according to an embodiment of the present disclosure is described first with reference to FIG. 1.

FIG. 1 illustrates an exemplary configuration of a wireless communication system according to an embodiment of the present disclosure. As shown in FIG. 1, according to an embodiment of the present disclosure, the wireless communication system includes a cell phone 20 and a display apparatuses 30A, 30X, and 30Y. The display apparatus 30A is placed in a room of a user of the cell phone 20. The display apparatus 30X is placed in the next room X. The display apparatus 30Y is placed in the next room Y.

The cell phone 20 and the display apparatuses 30 having a wireless communication function serve as wireless communication apparatuses. These wireless communication apparatuses form a communication group and directly communicate with one another without using an access point. For example, when the cell phone 20 and the display apparatus 30A form a communication group and if the cell phone 20 directly sends content data to the display apparatus 30A, the display apparatus 30A can display the content data stored in the cell phone 20.

While in FIG. 1, the cell phone 20 and the display apparatuses 30 serve as the wireless communication apparatuses, the wireless communication apparatuses are not limited thereto. For example, examples of the wireless communication apparatus can include an information processing apparatus, such as a personal computer (PC), a portable music player, a home video processing apparatus (e.g., a DVD recorder or a video-cassette recorder), a home video display apparatus, a personal digital assistant (PDA), a home game console, a home electrical appliance, a mobile video processing device, an image pickup device, and a mobile game console.

In addition, examples of the content data exchanged between wireless communication apparatuses include audio data (e.g., music, speech, and radio program), video data (e.g., a movie, a television program, a video program, a picture, a painting, and a graphic chart), and a variety of data items such as a game and software.

Wi-Fi Direct

One of the communication standards that allows wireless communication apparatuses to directly communicate with one another is "Wi-Fi Direct". In Wi-Fi Direct, a plurality of wireless communication apparatuses detect the presence of other wireless communication apparatuses (Device Discovery, and Service Discovery) and authenticate other wireless communication apparatuses in WPS (Wi-Fi Protected Setup). Thus, the wireless communication apparatuses establish a direct connection with each other. In addition, in Wi-Fi Direct, it is determined which one of the wireless communication apparatuses will serve as a parent node (Group Owner) and which one of the wireless communication apparatuses will serve as a child node (Client). In this way, a communication group is formed. Formation of such a communication group in Wi-Fi Direct is described in more detail below with reference to FIG. 2.

Figure 2:
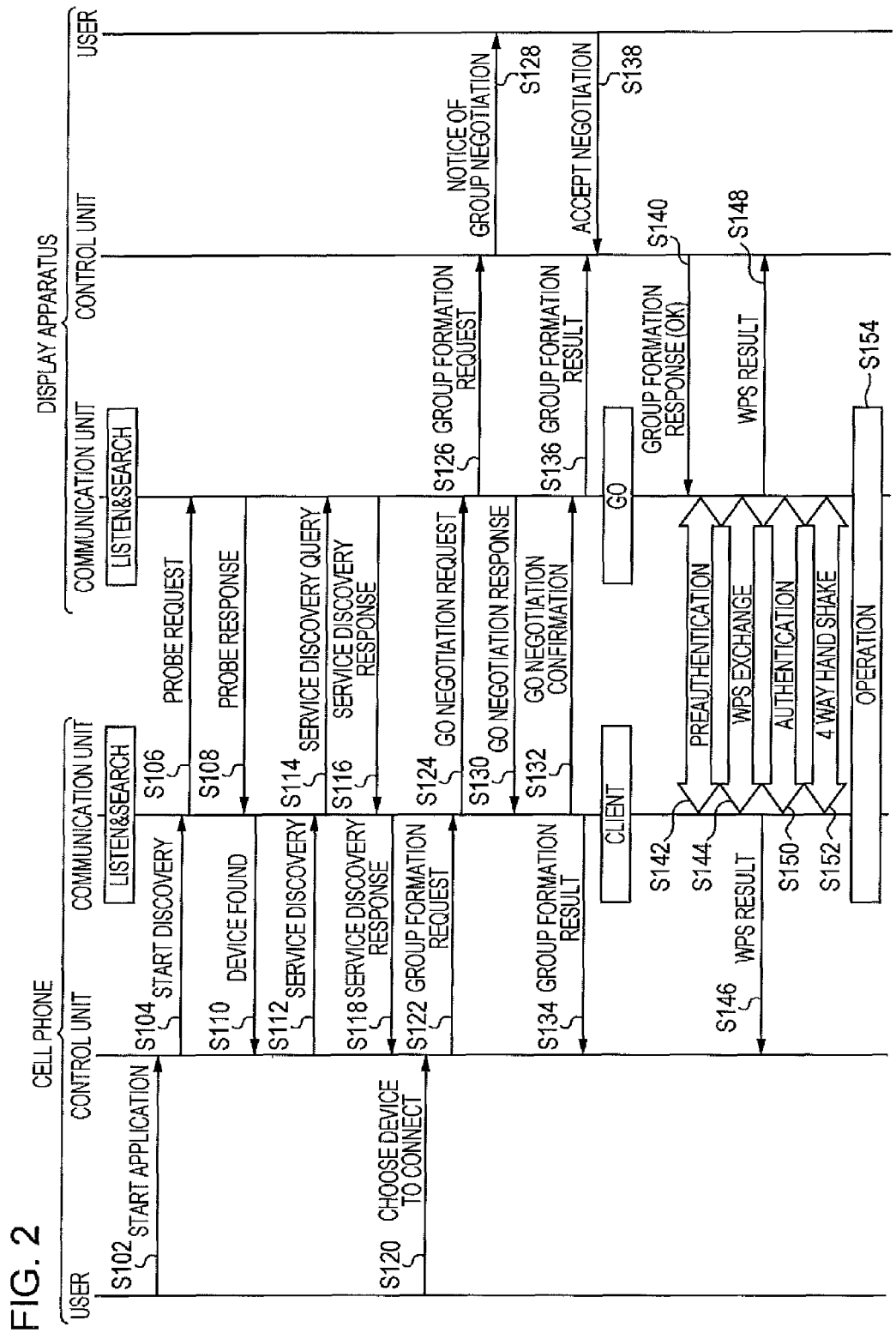
FIG. 2 illustrates an example of the procedure of establishment of a direct connection in Wi-Fi Direct.

FIG. 2 illustrates an example of the procedure of establishment of a direct connection in Wi-Fi Direct. As shown in FIG. 2, upon receiving an instruction indicating start of an application that performs a direct connection from a user of a cell phone (S102), the cell phone performs Device Discovery through steps S104 to S110. More specifically, the cell phone transmits a probe request (a response request signal) (S106) and receives a probe response (a response signal) for the probe request from a display apparatus (S108). In this way, the cell phone is aware of the presence of the display apparatus.

Subsequently, the cell phone performs Service Discovery through steps S112 to S118. More specifically, the cell phone transmits Service Display Query in order to inquire about the services supported by the display apparatus that was discovered in Device Discovery (S114). Thereafter, upon receiving Service Discovery Response from the display apparatus (S118), the cell phone is aware of the services supported by the display apparatus.

Figure 3:
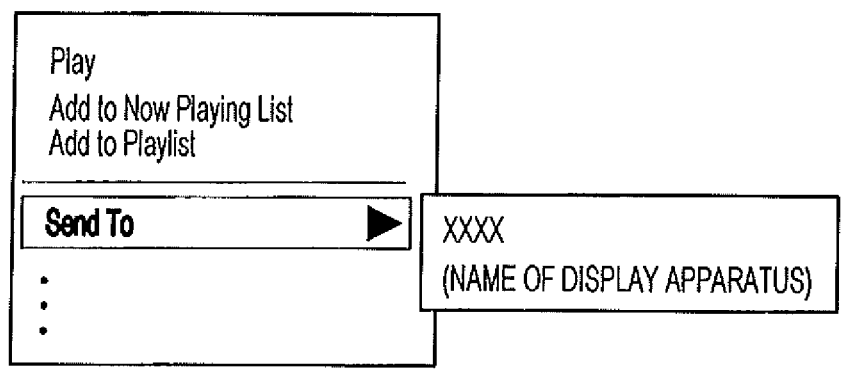
FIG. 3 illustrates an example of a connection selection screen.

Subsequently, for example, the cell phone displays a connection selection screen shown in FIG. 3. If "xxxx" (i.e., the name of a display apparatus) is selected in the connection selection screen (step S120), the cell phone performs "Group Formation" with the display apparatus through steps S122 to S140. More specifically, the cell phone and the display apparatus exchange priority information with each other used for determining which one will serve as a group owner (S124 and S130). The one of the cell phone and the display apparatus having a higher priority serves as a group owner. In FIG. 2, the display apparatus operates as a group owner, and the cell phone operates as a client.

Thereafter, the cell phone and the display apparatus perform authentication/connection processes, such as preAuthentication, WPS exchange, Authentication, and 4 way handshake (S142 to S152). In this way, the cell phone and the display apparatus establish a direct connection with each other (S154).

Note that in order to advance WPS, the display apparatus may also display a connection confirmation screen for asking a user whether the user wants to establish the connection. The connection confirmation screen is described in more detail below with reference to FIG. 4.

Figure 4:
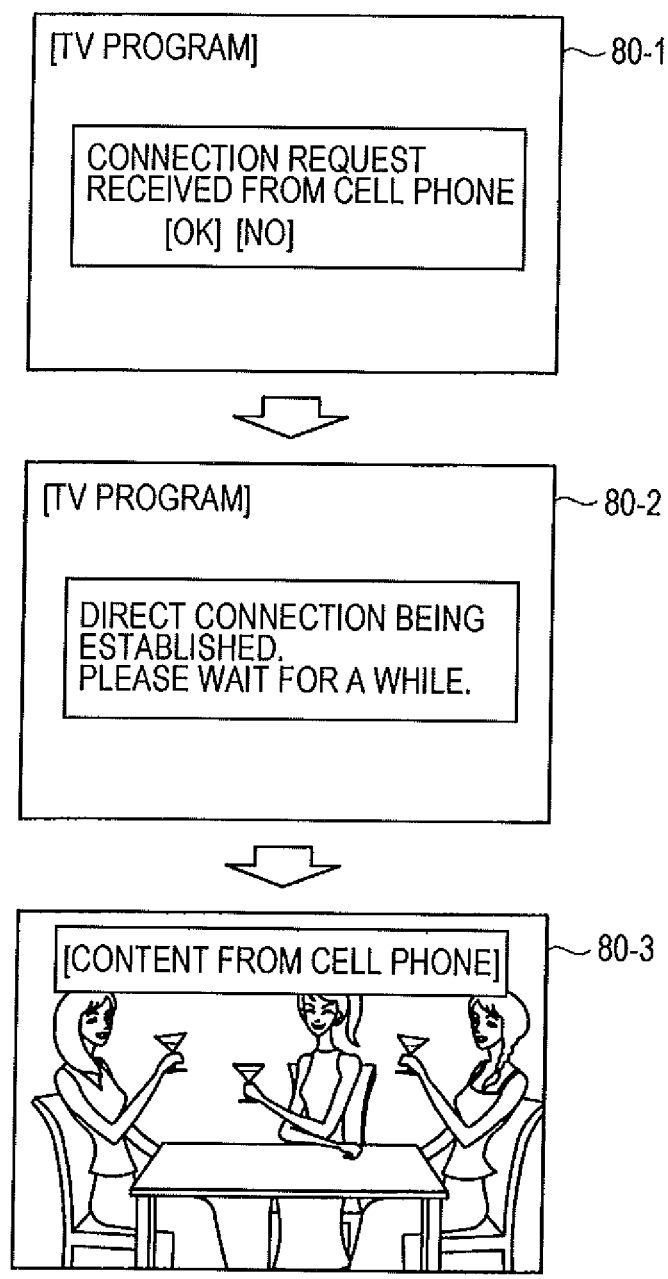
FIG. 4 illustrates an example of transition of displayed screens.

FIG. 4 illustrates transition of screens displayed by the display apparatus. As shown in FIG. 4, upon receiving Group Formation Request from the cell phone (S126), the display apparatus displays a connection confirmation screen 80-1 used for connection with the cell phone. If the user selects "OK" in the connection confirmation screen 80-1 (S138), the display apparatus regards this selection as pressing of Push Button in WPS (S140). Thus, processes for connecting the cell phone to the display apparatus are performed.

While the connection processes are being performed, the display apparatus displays a screen 80-2 including a message indicating that establishment of a direct connection is in execution. Subsequently, after a direct connection between the cell phone and the display apparatus has been established, the display apparatus displays a playback screen 80-3 for content received from the cell phone.

Problem Regarding Connection Target

In the example shown in FIG. 1, when the user of the cell phone 20 wants to connect the cell phone 20 to the display apparatus 30A through a direct connection and if only Device Discovery illustrated in FIG. 2 is used, the display apparatus 30X placed in the next room X and the display apparatus 30Y placed in the next room Y may be detected in addition to the display apparatus 30A, since the transmission distance of the Wi-Fi radio wave is long.

To solve such a problem, the cell phone 20 may display a connection selection screen including the detected display apparatuses 30, which are candidates of the connection target, and the cell phone 20 may determine the communication target on the basis of selection performed by the user. However, this technique has several disadvantages. For example, it is troublesome for the user to select one of the connection targets displayed in the connection selection screen including a plurality of candidates of the connection target.

In addition, the user may select one of the display apparatuses 30X and 30Y in the next rooms by mistake. In such a case, a selection confirmation screen is displayed on the display apparatus 30X or 30Y. However, the user in the next room may allow the connection to be made by mistake. In this case, the cell phone 20 is connected to the display apparatus 30X or 30Y by mistake.

Furthermore, a problem of a connection confirmation screen being displayed on the wireless communication apparatus 30X or 30Y located in the next room by mistake arises. For example, even when the user sitting in the next room rejects the connection, the user of the cell phone 20 may repeatedly attempt to make a connection if the user of the cell phone 20 is not aware that they are selecting the wireless communication apparatus in the next room. Accordingly, a connection confirmation screen may repeatedly appear on the display apparatus 30X or 30Y located in the next room.

To solve such a problem, it can be determined whether the nearby wireless communication apparatus detected by the cell phone 20 is located in the room in which the cell phone 20 is located or in the vicinity of the cell phone 20 using the received power (i.e., the RSSI) of a wireless signal transmitted from a nearby wireless communication apparatus. However, the received power does not monotonically vary in accordance with the distance between the cell phone 20 and any one of the display apparatuses. Therefore, it is difficult to identify the distance between the cell phone 20 and any one of the display apparatuses using the received power. The reason for that is described below.

Figure 5:
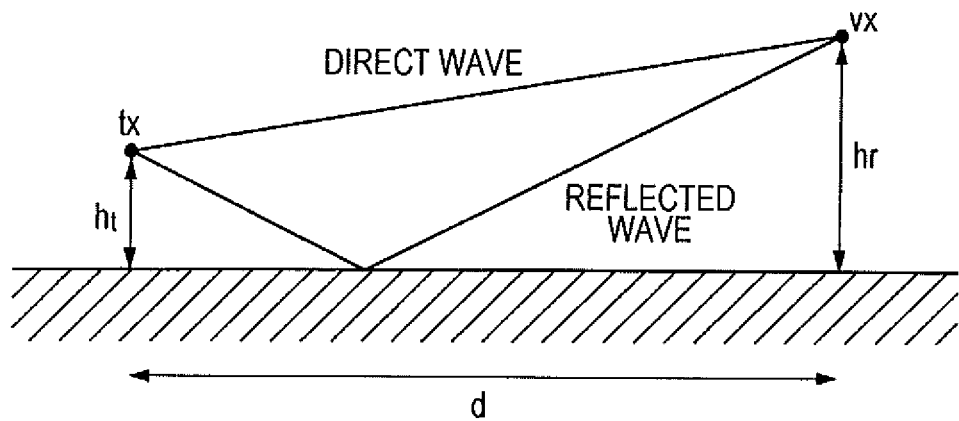
FIG. 5 illustrates a transmission model of a radio wave.

FIG. 5 illustrates a transmission model of a radio wave. As shown in FIG. 5, the radio waves transmitted from a transmitting antenna and received by a receiving antenna include not only a direct wave directly transmitted from the transmitting antenna to the receiving antenna but also a reflected wave reflected by a floor. As shown in FIG. 5, in short-range communication performed at a location spaced apart from a wall, the direct wave and the reflected wave reflected by the floor are dominant. Therefore, such communication can be approximated by a propagation model called a "two-ray propagation model".

Figure 6:
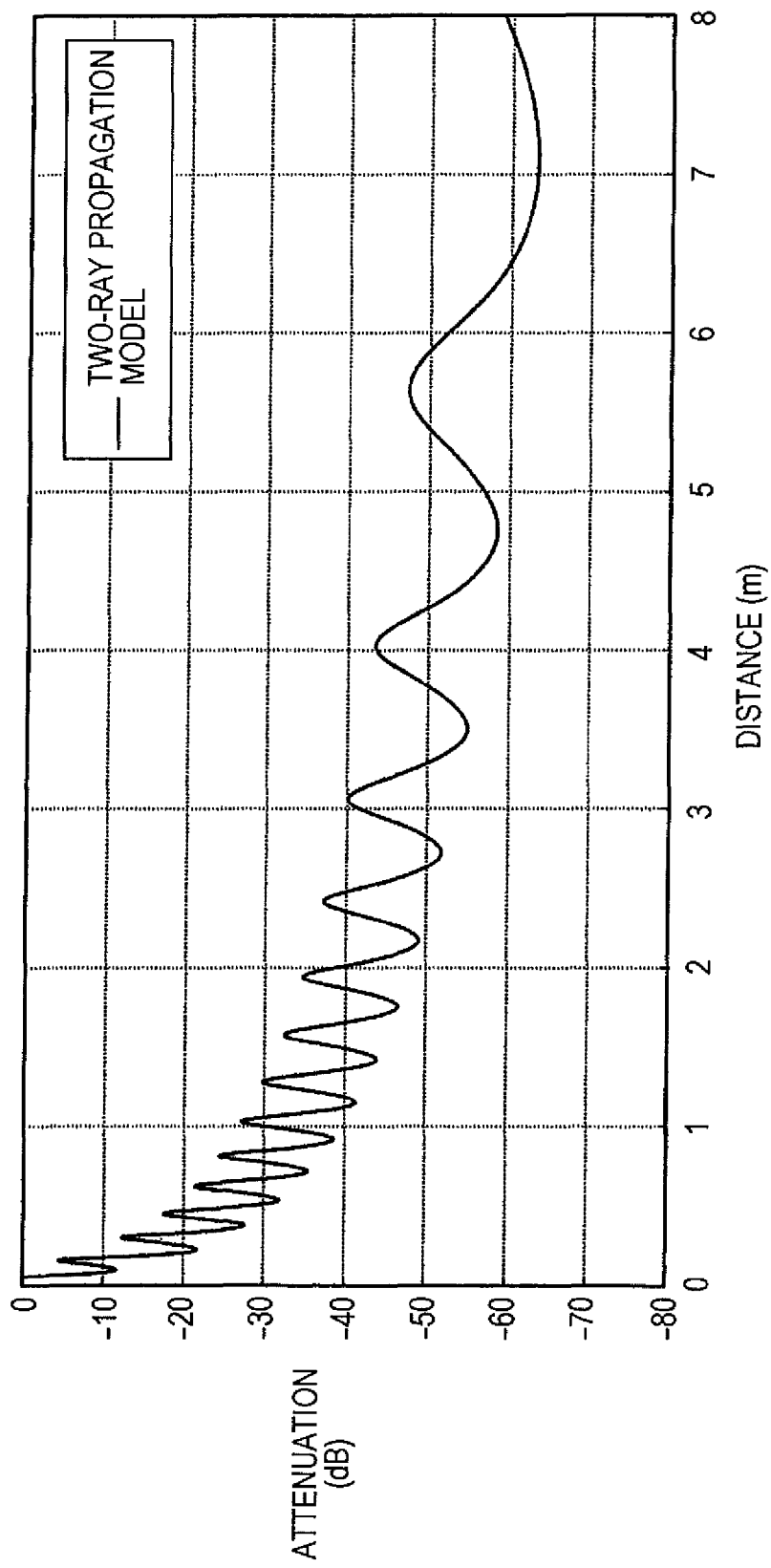
FIG. 6 illustrates an example of computation of transmission loss between a transmitting antenna and a receiving antenna in a two-ray propagation model.

FIG. 6 illustrates an example of computation of transmission loss between a transmitting antenna and a receiving antenna in a two-ray propagation model. Note that the computation is made under the following conditions:

Height of the transmitting antenna and the receiving antenna=1 m, and

Reflectance of the floor=50%.

As can be seen from FIG. 6, the transmission loss does not monotonically increase with the distance between the transmitting antenna and the receiving antenna, but repeatedly increases and decreases in an oscillating manner. This is because the direct wave and the reflected wave constructively and destructively interfere with each other on the basis of a phase difference caused by a difference between the transmission distances of the direct wave and the reflected wave. For this reason, it is difficult to accurately detect the distance between the transmitting antenna and the receiving antenna by using only the received power. Similarly, as illustrated in FIG. 7, it is difficult to determine whether the wireless communication apparatus serving as a transmission source is located in the same room by only using the received power.

Figure 7:
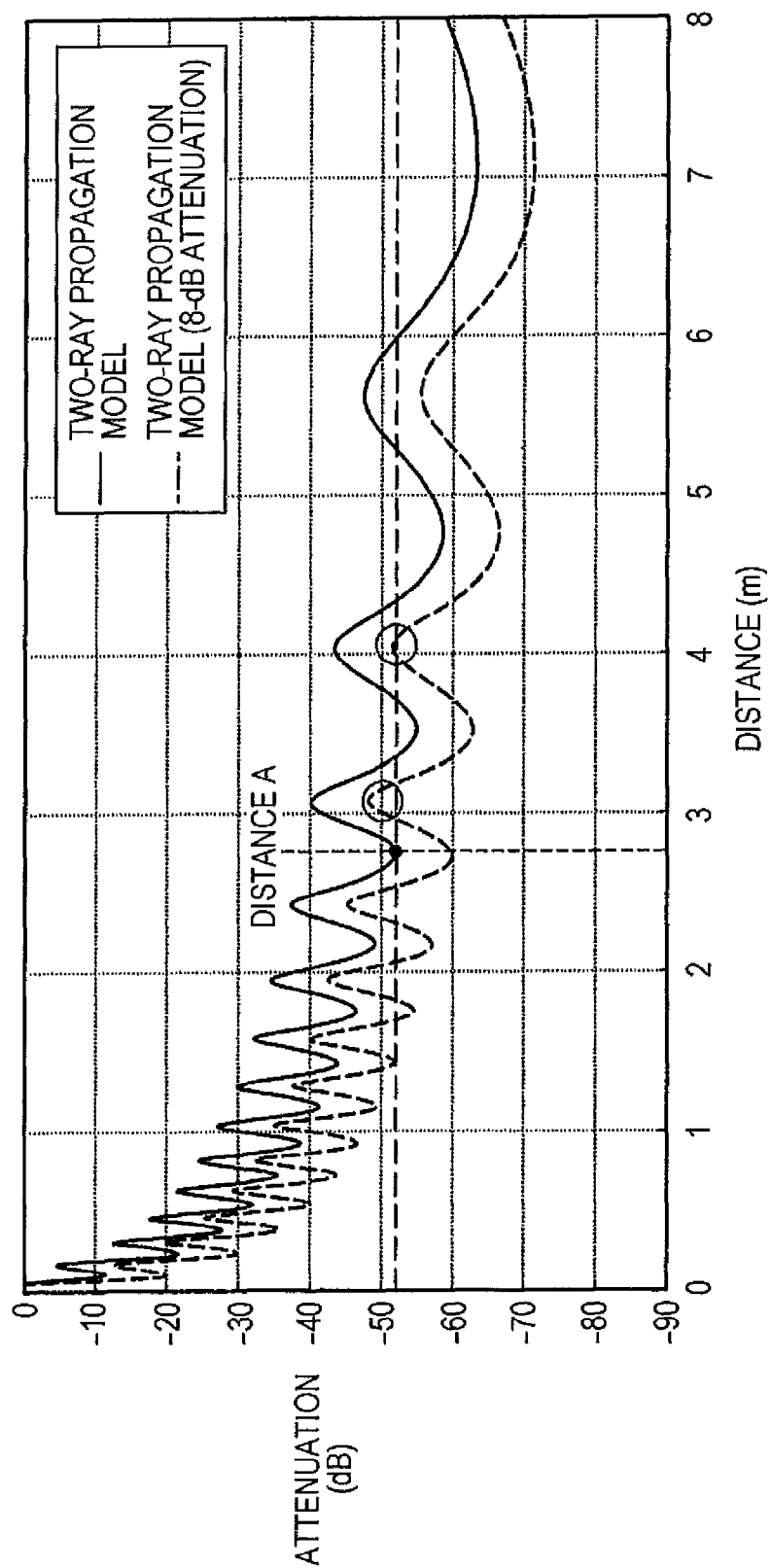
FIG. 7 illustrates an example of computation of transmission loss using the two-ray propagation model and the transmission loss of a radio wave propagating from the next room, which is obtained by adding 8 dB (the estimated value of transmission loss due to a wall) to the transmission loss computed using the two-ray propagation model.

FIG. 7 illustrates an example of computation of transmission loss using the two-ray propagation model and the transmission loss of a radio wave propagating from the next room, which is obtained by adding 8 dB (the estimated value of transmission loss due to a wall) to the transmission loss computed using the two-ray propagation model. As shown in FIG. 7, in some cases, the transmission loss of radio waves transmitted from a wireless communication apparatus located, for example, in the same room and distance A away is greater than that of radio waves transmitted from a wireless communication apparatus located in the next room and about 3 m or 4 m away. Thus, it is difficult to correctly detect which one of the wireless communication apparatuses is located in the same room by only comparing the levels of the received power with one another.

Accordingly, the idea of the present embodiment of the disclosure was conceived. According to the present embodiment of the disclosure, the cell phone 20 and the display apparatuses 30 can correctly identify the target wireless communication apparatus. Such cell phone 20 and display apparatuses 30 are described in detail below.

Figure 8:
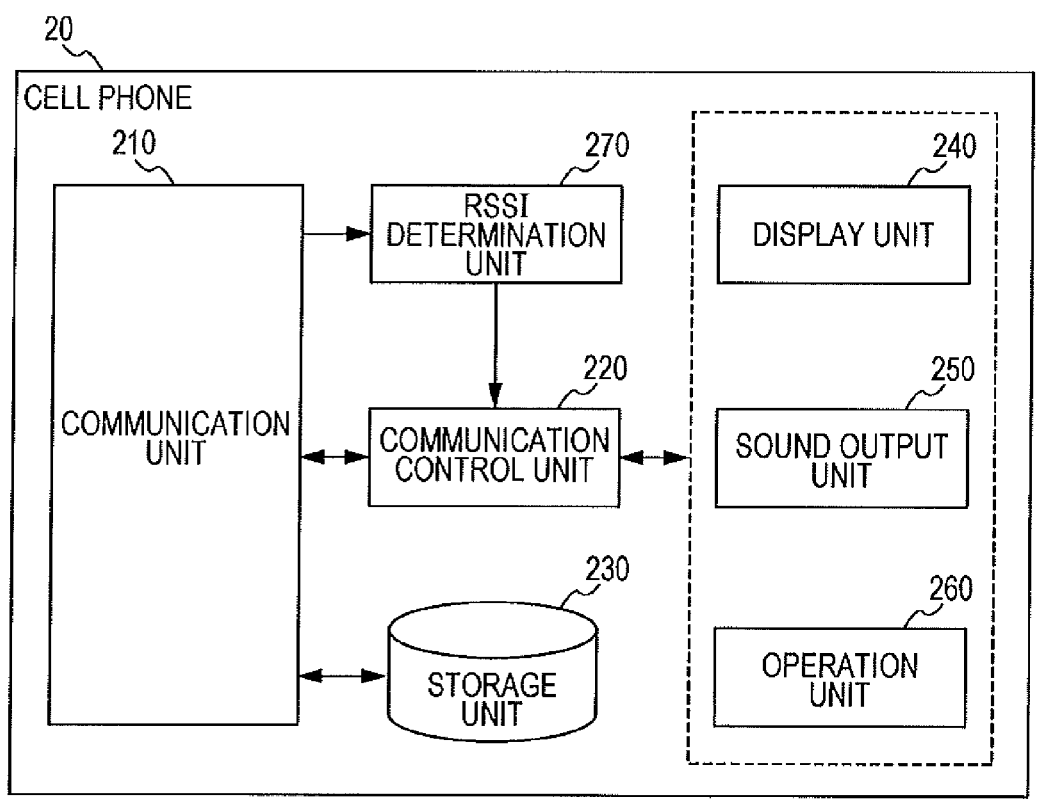
FIG. 8 is a functional block diagram illustrating an exemplary configuration of a cell phone according to an embodiment of the present disclosure.

2. Configuration of Cell Phone and Display Apparatus According to Embodiment of Present Disclosure Configuration of Cell Phone FIG. 8 is a functional block diagram illustrating the configuration of the cell phone 20. As shown in FIG. 8, the cell phone 20 includes a communication unit 210, a communication control unit 220, a storage unit 230, a display unit 240, a sound output unit 250, and an operation unit 260, and an RSSI determination unit 270.

The communication unit 210 functions as a receiving unit for performing a receiving process, a transmitting unit for performing a transmitting process, and a measuring unit for measuring the RSSI of a reception signal. For example, the communication unit 210 generates a variety of data frames and data packets in accordance with a request received from the communication control unit 220 and adds a variety of data headers and error detection code, such as an FCS (Frame Check Sequence), to the data frames and data packets. In addition, the communication unit 210 generates a modulated signal in the frequency range of a carrier wave from the data subjected to the above-described processes and converts the modulated signal into a radio signal. Thereafter, the communication unit 210 transmits the radio signal.

Furthermore, upon receiving a radio signal, the communication unit 210 down converts the radio signal and converts the radio signal into a bit string. In this way, the communication unit 210 decodes the variety of data frames. Thereafter, the communication unit 210 analyzes the headers attached to the data frames and detects whether the data frame has an error on the basis of the error detection code. Still furthermore, the communication unit 210 measures the RSSI of the radio signal when performing the receiving process.

The communication control unit 220 controls the receiving process and the transmitting process performed by the communication unit 210. For example, the communication control unit 220 determines the frequency used, generates a control message, analyzes a transmission command and a control message, and controls a connection process. Note that examples of a control message include a beacon, a response to a received beacon, a probe request, broadcasting information (e.g., a probe response), a service discovery query, and a service discovery response.

The storage unit 230 serves as a working area used for data processing performed by the communication control unit 220 or a recording medium that stores a variety of content data items. A nonvolatile memory, a magnetic disk, an optical disk, or a magnetooptical (MO) disk can be used as the storage unit 230. Examples of the nonvolatile memory include an electrically erasable programmable read-only memory (EEPROM) and an erasable programmable read-only memory (EPROM). Examples of the magnetic disk include a hard disk and a disk-shaped magnetic medium. Examples of the optical disk include a compact disc (CD), a digital versatile disc recordable (DVD-R), and a Blu-ray® Disc (BD).

The display unit 240 displays a variety of screens regarding a direct connection. The screens displayed by the display unit 240 are described in more detail in Section "3. Operation Performed by Wireless Communication System according to Embodiment of Present Disclosure" below.

The sound output unit 250 serves as a notifying unit for informing the user of establishment of a direct connection when a direct connection according to the present embodiment is established. For example, the sound output unit 250 outputs a beep sound or dedicated music when a direct connection is established.

While the present embodiment has been described with reference to the sound output unit 250 as an example of the notifying unit, the notifying unit is not limited to the sound output unit 250. For example, the user can be notified of establishment of a direct connection by light being emitting from a status LED or flashing of the display unit 240.

The operation unit 260 receives a user operation. For example, a mouse, a keyboard, a button, a microphone, a switch, or a lever can be used as the operation unit 260.

The RSSI determination unit 270 determines whether the RSSI measured by the communication unit 210 is higher than a threshold value. By appropriately setting the threshold value, it can be determined that a wireless communication apparatus that has transmitted a radio signal having a RSSI higher than the threshold value is located in the same room as the cell phone 20. The threshold value is described below with reference to FIG. 9.

A wall is present between the cell phone 20 and a wireless communication apparatus in the next room (e.g., the display apparatus 30X or 30Y). Under a normal use condition, the distance between the cell phone 20 and the wireless communication apparatus in the next room is longer than, for example, 0.5 m. Accordingly, as shown in FIG. 9, the maximum power of radio waves emitted from the next room is exhibited at a distance of about 0.5 m (about −29 dB).

Figure 9:
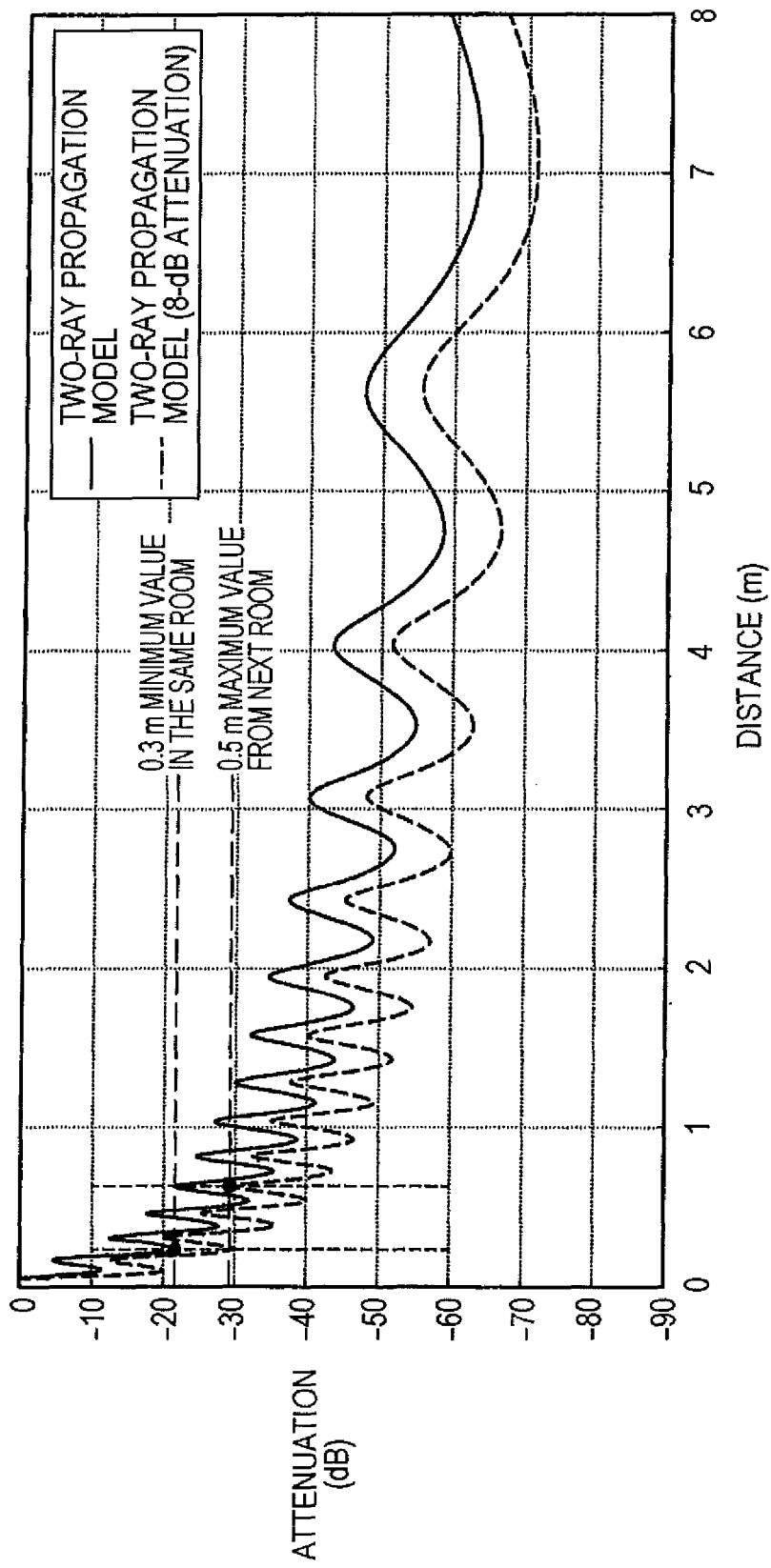
FIG. 9 illustrates an example of computation of transmission loss between a transmitting antenna and a receiving antenna in a two-ray propagation model.

Thus, a value that is greater than the maximum power of the radio waves emitted from the next room (e.g., the RSSI at a distance of about 0.3 m in the same room, as illustrated in FIG. 9) can be set as the threshold value. By using such a configuration, it can be correctly determined whether the wireless communication apparatus that has emitted a radio signal is located in the same room as the cell phone in accordance with whether the RSSI is higher than the threshold value.

In this way, according to the present embodiment, the RSSI determination unit 270 continuously determines whether the RSSI of a probe request transmitted intermittently is higher than the threshold value. If the RSSI determination unit 270 determines that the RSSI of a probe request transmitted intermittently is higher than the threshold value, the communication control unit 220 causes the communication unit 210 to transmit a probe response to the wireless communication apparatus that has transmitted the probe request. That is, if the RSSI determination unit 270 determines that the RSSI of the probe request is higher than the threshold value, the communication control unit 220 performs a process for establishing a direct connection with the wireless communication apparatus that has transmitted the probe request.

As a result, the user can directly connect the cell phone 20 to the display apparatus 30A through a simple physical operation in which the user moves the cell phone 20 closer to, for example, the display apparatus 30A in the same room.

Notes and Modifications

Note that the threshold value of the RSSI may be within 10 dB from the saturated value (the maximum value) of the RSSI of the communication unit 210. If the RSSI is saturated, the detection accuracy may be decreased. Therefore, it is effective that the threshold value is set within the above-described range where the detection accuracy is not decreased.

In addition, if probe requests are transmitted from a plurality of wireless communication apparatuses, the RSSI determination unit 270 can select the wireless communication apparatus having an RSSI that is higher than the threshold value and a difference between the RSSI and the RSSI of another wireless communication apparatus that is greater than a predetermined value. In such a case, the communication control unit 220 causes the communication unit 210 to transmit a probe response to the wireless communication apparatus selected by the RSSI determination unit 270. By employing such a configuration, a direct connection with the wireless communication apparatus that the user does not want can be further prevented.

Furthermore, if the RSSI of the probe request is on the increase and exceeds the threshold value and if the RSSI of the probe request is on the decrease and falls below the threshold value, the communication control unit 220 may cause the communication unit 210 to transmit a probe response. In this manner, a variation in the RSSI caused by the cell phone 20 moving closer to the apparatus that has transmitted a probe request and moving away from the apparatus can be detected in addition to simply detecting that the distance between the cell phone 20 and the apparatus is small, and control of transmitting a probe response can be effectively performed.

In addition, instead of simply using the RSSI measured by the communication unit 210, the RSSI determination unit 270 may use the RSSI obtained through an averaging operation using a moving average, maximum value detection, or envelope demodulation.

Configuration of Display Apparatus

In the above-described sections, the configuration of the cell phone 20 according to the present embodiment of the disclosure has been described. The configuration of the display apparatus 30 is described below with reference to FIG. 10.

Figure 10:
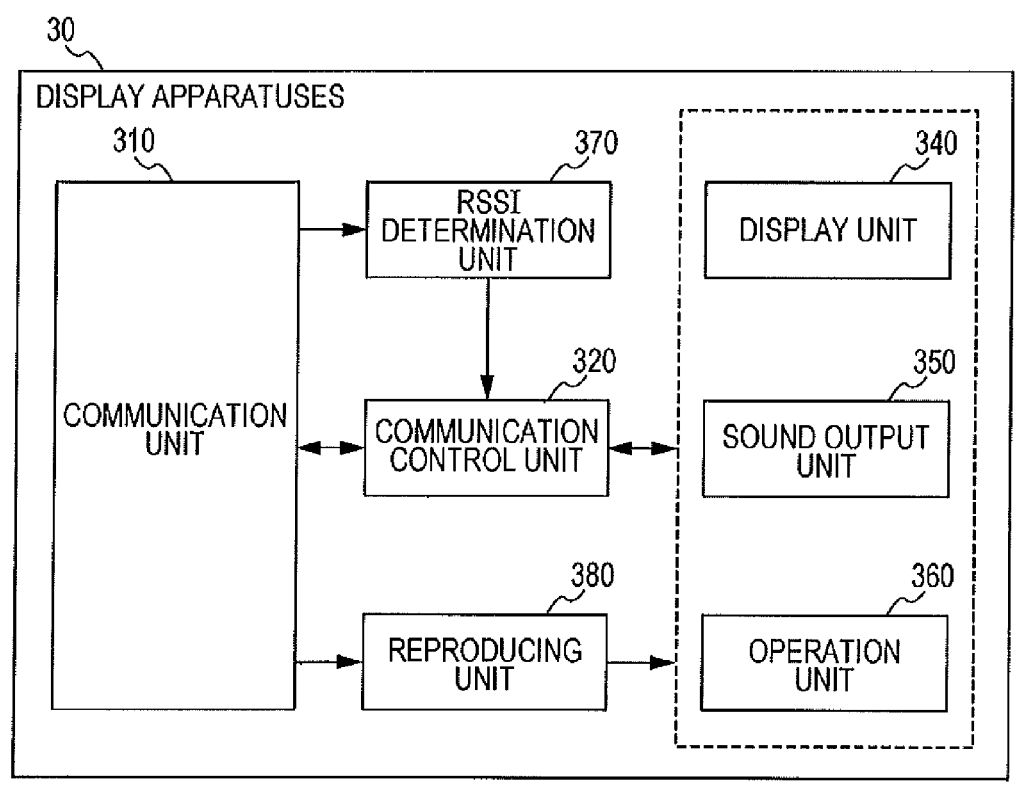
FIG. 10 is a functional block diagram illustrating an exemplary configuration of a display apparatus according to an embodiment of the present disclosure.

FIG. 10 is a functional block diagram illustrating the configuration of the display apparatuses 30 according to an embodiment of the present disclosure. As shown in FIG. 10, the display apparatus 30 includes a communication unit 310, a communication control unit 320, a display unit 340, a sound output unit 350, and an operation unit 360, an RSSI determination unit 370, and a reproducing unit 380.

Most of the configuration of the display apparatus 30 is similar to those of the cell phone 20. For example, the configuration of the communication unit 310 of the display apparatus 30 can be substantially the same as that of the communication unit 210 of the cell phone 20. The configuration of the communication control unit 320 of the display apparatus 30 can be substantially the same as that of the communication control unit 220 of the cell phone 20. The configuration of the RSSI determination unit 370 of the display apparatus 30 can be substantially the same as that of the RSSI determination unit 270 of the cell phone 20.

That is, briefly speaking, upon receiving a probe request from the cell phone 20, the display apparatus 30 continuously measures the RSSI of the probe request. If the RSSI of the probe request exceeds the threshold value, the display apparatus 30 transmits a probe response to the cell phone 20.

In addition, the reproducing unit 380 reproduces content data received from the cell phone 20 after a direct connection between the display apparatus 30 and the cell phone 20 has been established. The display unit 340 displays the screen of the reproduced content data obtained from the reproducing unit 380.

3. Operation Performed by Wireless Communication System According to Embodiment of Present Disclosure In the above-described sections, the configurations of the cell phone 20 and the display apparatus 30 according to the embodiment of the present disclosure have been described. An exemplary operation of the wireless communication system including the cell phone 20 and the display apparatus 30 according to the embodiment of the present disclosure is described next.

3-1. First Example of Operation

Figure 11:
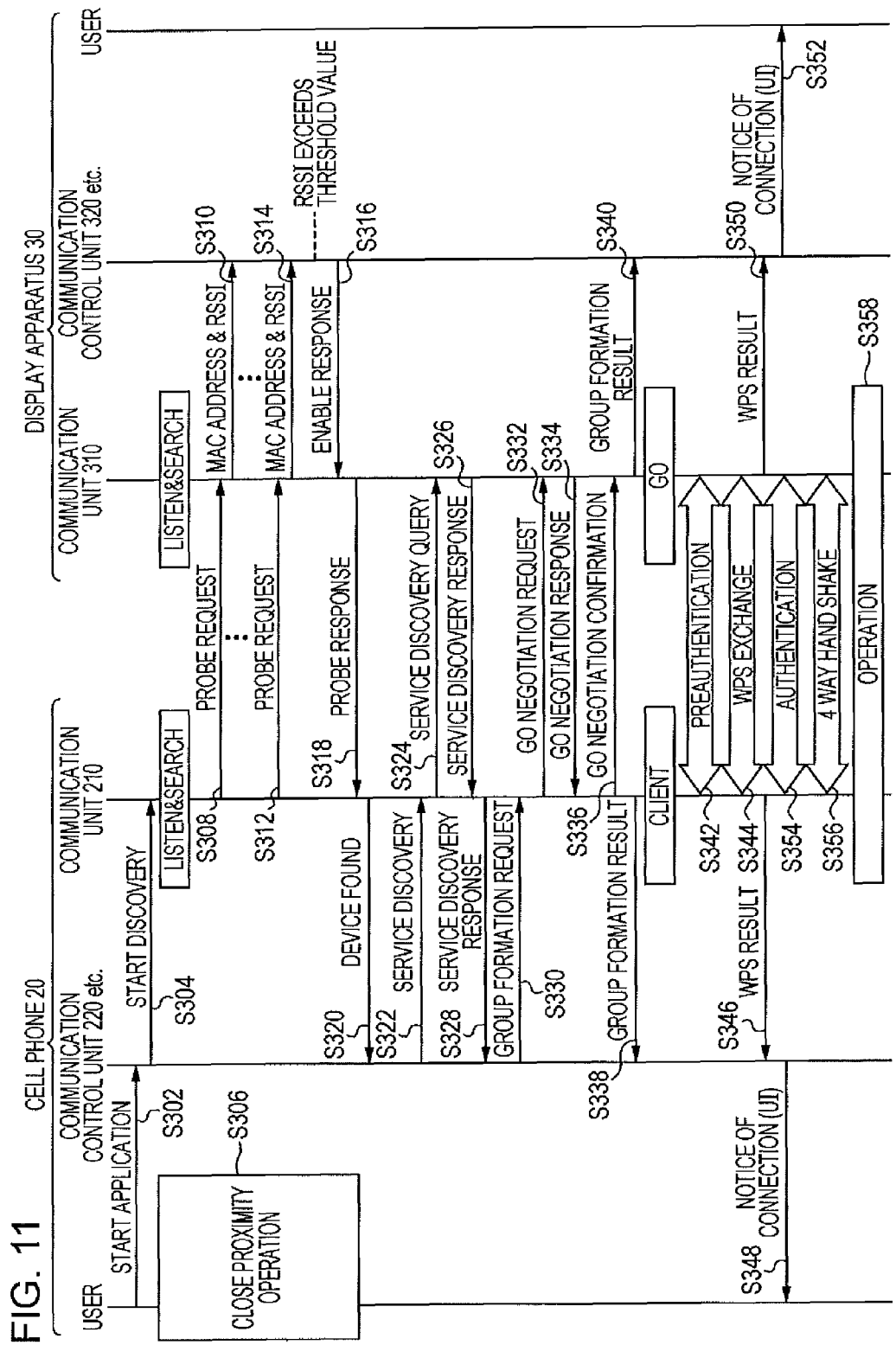
FIG. 11 is a sequence diagram illustrating an example of a first operation performed by a wireless communication system according to the embodiment of the present disclosure.

FIG. 11 is a sequence diagram illustrating an example of a first operation performed by the wireless communication system according to the embodiment of the present disclosure. If, in an application selection screen 40-1 displayed on the display unit 240 shown in FIG. 12, the user selects "direct connection" (S302), the cell phone 20 starts Device Discovery through steps S304 to S320.

Figure 12:
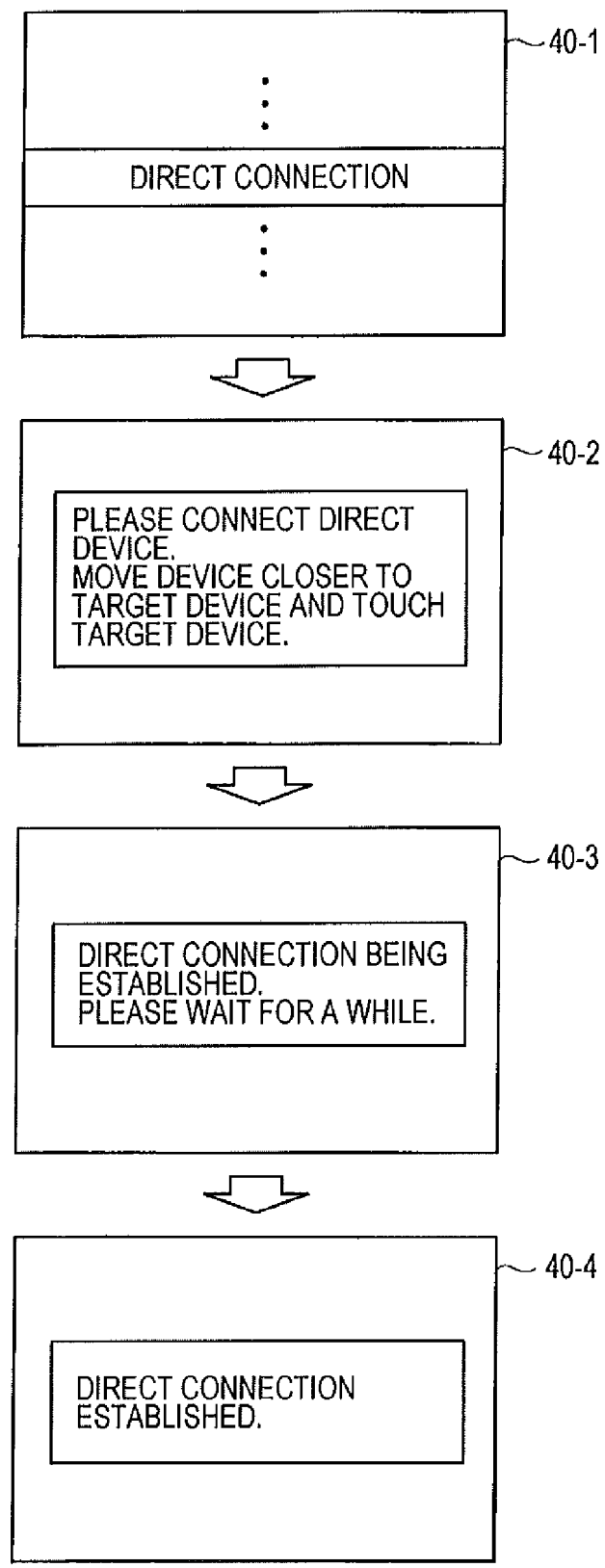
FIG. 12 illustrates transition of screens displayed on the cell phone.

In addition, when Device Discovery is started, the display unit 240 of the cell phone 20 displays a screen 40-2 that prompts the user to perform a close proximity operation shown in FIG. 12. In response to the message displayed in the screen 40-2, the user starts moving the cell phone 20 closer to the display apparatus 30 (S306).

Thereafter, in Device Discovery, the cell phone 20 continuously transmits the probe request (the response request signal) until it receives a probe response (a response signal) (S308 and S312). In contrast, the display apparatus 30 continuously measures the RSSI of the probe request received from the cell phone 20 (S310 and S314). Thereafter, if the cell phone 20 moves closer to the display apparatus 30 and, therefore, the RSSI of the probe request received from the cell phone 20 exceeds the threshold value, the display apparatus 30 transmits a probe response to the cell phone 20 (S318).

If the cell phone 20 receives the probe request transmitted from the display apparatus 30 and discovers the presence of the display apparatus 30, the cell phone 20 starts Service Discovery through steps S322 to S328. More specifically, the cell phone 20 transmits Service Discovery Query in order to inquire about the services supported by the display apparatus 30 that is discovered using Device Discovery (S324). Subsequently, the cell phone 20 receives Service Discovery Response from the display apparatus 30 (S326) and becomes aware of the services supported by the display apparatus 30.

In addition, when Service Discovery is started, the display unit 240 of the cell phone 20 displays a screen 40-3 including a message indicating that a direct connection is being established (refer to FIG. 12).

Subsequently, the cell phone 20 performs Group Formation through steps S330 to S340. More specifically, the cell phone 20 exchanges priority information indicating the priority of Group Owner with the display apparatus 30 (S332 and S334). Thereafter, it is determined that the one of the cell phone 20 and the display apparatus 30 having a higher priority serves as Group Owner. In the example shown in FIG. 11, the display apparatus 30 functions as Group Owner, and the cell phone 20 functions as Client.

Subsequently, the cell phone 20 and the display apparatus 30 perform an authentication/connection process including preAuthentication (S342), WPS exchange (S344), Authentication (S354), and 4 way handshake (S356). In this way, a direct connection therebetween is established (S358). The direct connection continues even when the distance between the cell phone 20 and the display apparatus 30 is increased.

Note that after WPS has been completed, each of the display unit 240 of the cell phone 20 and the display unit 340 of the display apparatus 30 displays a completion information screen 40-4 including a message indicating that a direct connection has been established (S348 and S352).

If the cell phone 20 is in close proximity to the display apparatus 30, it is difficult for the user of the cell phone 20 to view the completion information screen 40-4. For this reason, the sound output unit 250 of the cell phone 20 may output a beep sound or dedicated music that indicates establishment of a direct connection.

As described above, according to the first example of an operation, moving the cell phone 20 closer to the display apparatus 30 can be considered as pressing of WPS Push Button. Accordingly, the user can directly connect the cell phone 20 to the display apparatus 30A through a simple physical operation in which the user moves the cell phone 20 closer to, for example, the display apparatus 30A in the same room. In addition, by detecting close proximity of the cell phone 20 to the display apparatus 30A using an optimum threshold value of an appropriate RSSI, inappropriate direct connection between the cell phone 20 and, for example, the display apparatus 30X in the next room can be prevented.

3-2. Second Example of Operation

A second example of the operation performed by the wireless communication system according to an embodiment of the present disclosure is described next with reference to FIG. 13. As described in more detail below, the second example of the operation differs from the first example of the operation in that the cell phone 20 and the display apparatus 30 bi-directionally transmit the probe requests.

Figure 13:
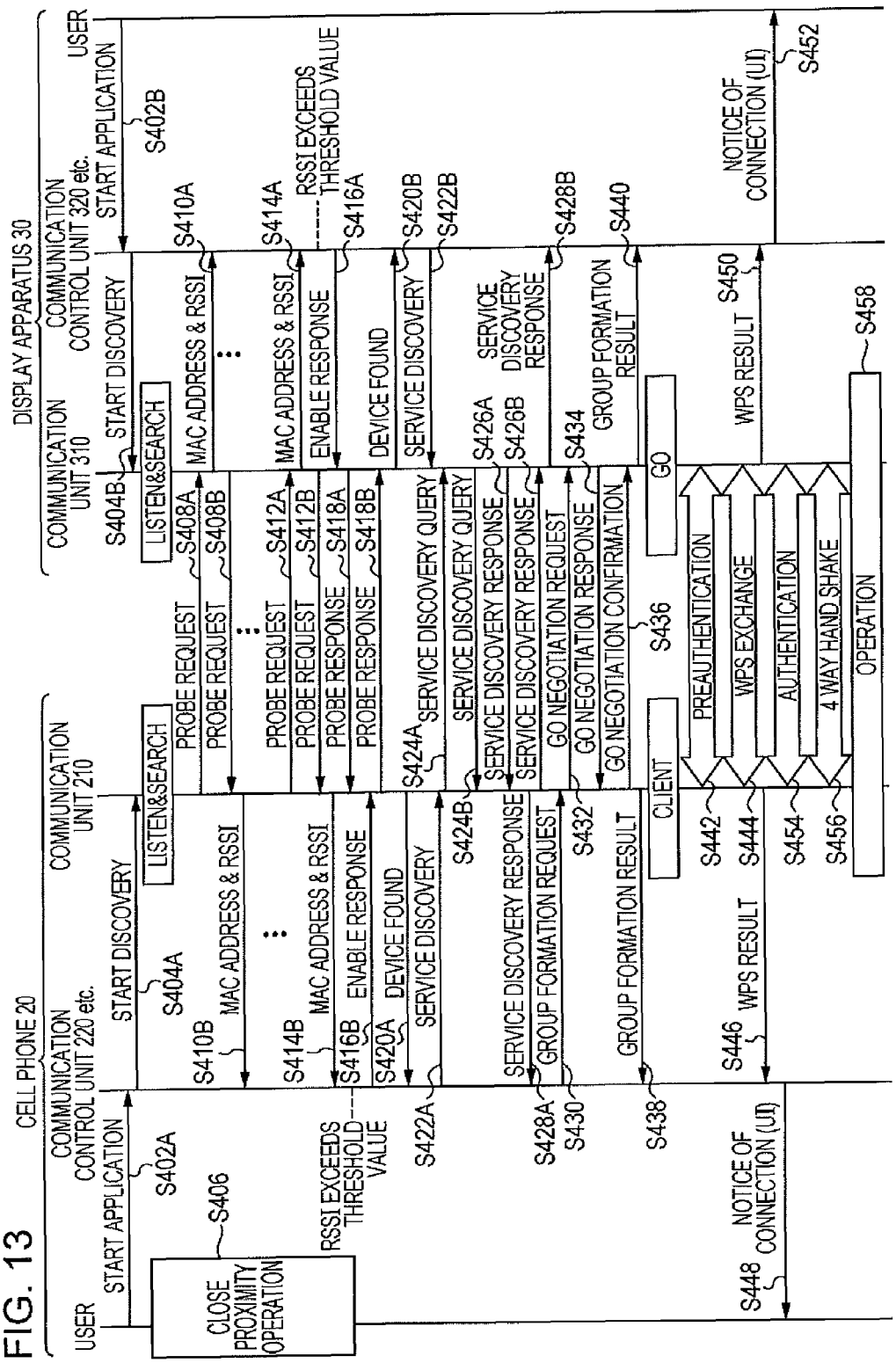
FIG. 13 is a sequence diagram illustrating an example of a second operation performed by the wireless communication system according to the embodiment of the present disclosure.

FIG. 13 is a sequence diagram illustrating an example of the second operation performed by the wireless communication system according to the embodiment of the present disclosure. As shown in FIG. 13, if, in the application selection screen 40-1 displayed on the display unit 240 of the cell phone 20, the user selects "direct connection" (S402A), the cell phone 20 starts Device Discovery through steps S404A to S420A. Similarly, if, in an application selection screen 40-1 displayed on the display unit 340 of the display apparatus 30, the user selects "direct connection" (S402B), the display apparatus 30 starts Device Discovery through steps S404B to S420B.

In addition, when Device Discovery is started, the display unit 240 of the cell phone 20 displays a screen 40-2 that prompts the user to perform a close proximity operation shown in FIG. 12. In response to the message displayed in the screen 40-2, the user starts moving the cell phone 20 closer to the display apparatus 30 (S406).

Thereafter, in Device Discovery, each of the cell phone 20 and the display apparatus 30 continuously transmits the probe request (the response request signal) until it receives a probe response (a response signal) (S408A, S412A, S408B, and S412B). Note that since the cell phone 20 can identify the MAC address of the display apparatus 30 by receiving the probe request from the display apparatus 30, the cell phone 20 may transmit a probe request to the display apparatus 30 using the MAC address as a destination. According to such a configuration, an apparatus other than the display apparatus 30 does not respond to the probe request by mistake.

In addition, each of the cell phone 20 and the display apparatus 30 continuously measures the RSSI of the received probe request (S410A, S414A, S410B, and S414B). If the cell phone 20 is moved closer to the display apparatus 30 and, therefore, the RSSI of the probe request exceeds the threshold value, each of the cell phone 20 and the display apparatus 30 transmits a probe response (S418A and S418B).

Note that the cell phone 20 may control the frequency of the probe requests transmitted to the display apparatus 30 in accordance with the RSSI of the probe request received from the display apparatus 30. For example, if the RSSI is sufficiently smaller than the threshold value, it takes a long time until the RSSI exceeds the threshold value. Therefore, with a decrease in the RSSI of the probe request received from the display apparatus 30, the cell phone 20 can decrease the frequency of the probe requests transmitted to the display apparatus 30. More specifically, the cell phone 20 can determine a relationship between the RSSI and the frequency of transmission of the probe request on the basis of a formula or a table. According to such a configuration, the traffic necessary for a direct connection can be reduced.

Subsequently, if the cell phone 20 discovers the presence of the display apparatus 30 by receiving a probe request from the display apparatus 30, the cell phone 20 performs Service Discovery through steps S422A to S428A. Similarly, if the display apparatus 30 discovers the presence of the cell phone 20 by receiving a probe request from the cell phone 20, the display apparatus 30 performs Service Discovery through steps S422B to S428B.

Note that if the cell phone 20 discovers the presence of the display apparatus 30 by receiving a probe response from the display apparatus 30, the cell phone 20 may display a confirmation screen for asking the user whether the user allows a direct connection to be made with the display apparatus 30. According to such a configuration, connection of the cell phone 20 with an apparatus that the user does not desire can be more reliably prevented.

Subsequently, the cell phone 20 performs Group Formation with the display apparatus 30 through steps S430 to S440. More specifically, the cell phone 20 exchanges priority information indicating the priority of Group Owner with the display apparatus 30 (S432 and S434). Thereafter, it is determined that the one of the cell phone 20 and the display apparatus 30 having a higher priority functions as Group Owner. In the example shown in FIG. 13, the display apparatus serves as Group Owner, and the cell phone 20 serves as Client.

Subsequently, the cell phone 20 and the display apparatus 30 perform an authentication/connection process including preAuthentication (S442), WPS exchange (S444), Authentication (S454), and 4 way handshake (S456). In this way, a direct connection therebetween is established (S458).

4. Summary

As described above, a wireless communication apparatus, such as the cell phone 20 or the display apparatus 30, according to an embodiment of the present disclosure continuously determines whether the RSSI of a continuously transmitted probe request is higher than a threshold value. If it is determined that the RSSI of the probe request is higher than the threshold value, the wireless communication apparatus causes the communication unit 210 to transmit a probe response to the apparatus that has transmitted the probe request. That is, when it is determined that the RSSI of the probe request is higher than the threshold value, the wireless communication apparatus performs a process for establishing a direct connection with the apparatus that has transmitted the probe request.

As a result, the user can directly connect the cell phone 20 to, for example, the display apparatus 30A located in the same room through a simple physical operation in which the user moves the cell phone 20 closer to the display apparatus 30A.

In addition, by setting the threshold value of the RSSI to an optimum value, a direct connection with a wireless communication apparatus that the user does not want can be prevented. More specifically, the threshold value can be effectively set to a value that is higher than the expected maximum value of a radio wave coming from the next room or a neighboring house.

While the exemplary embodiment of the present disclosure has been described with reference to the accompanying drawings, the present disclosure is not limited thereto. A person skilled in the art can easily conceive the idea of modifying or altering the technology within the scope of the appended claims. Therefore, these modifications and alterations are to be embraced within the scope of the present disclosure.

For example, in the above-described embodiment, the RSSI of the probe request is measured, and it is determined whether the probe response is to be transmitted in accordance with the result of the measurement. However, the present disclosure is not limited to such an application. As a modification, for example, the RSSI of Service Discovery Query may be measured, and Service Discovery Response may be transmitted in accordance with the result of the measurement.

In addition, the steps of the processing performed by the wireless communication system described in the present specification are not necessarily executed in the time sequence described in the sequence diagram. For example, the steps of the processing performed by the wireless communication system may be executed in an order that differs from that of the sequence diagram or in parallel.

Furthermore, a computer-readable program can be generated for causing the hardware components included in the cell phone 20 and the display apparatus 30, such as a CPU, a ROM, and a RAM, to function as the above-described components of the cell phone 20 and the display apparatus 30. Still furthermore, a storage medium for storing the computer program can be provided.

What is claimed is:

1. A first wireless communication apparatus comprising:
  a receiving unit configured to receive a response request signal;
  a transmitting unit configured to transmit a response signal in response to the response request signal;
  a measuring unit configured to continuously measure received power of the response request signal received by the receiving unit; and
  a communication control unit configured to cause the transmitting unit to transmit the response signal to a second wireless communication apparatus that has transmitted the response request signal if the received power of the response request signal is higher than a threshold value,
  wherein in the case where the receiving unit receives the response request signal from each of a plurality of second wireless communication apparatuses, if the received power of the response request signal transmitted from one of the plurality of second wireless communication apparatuses is higher than a threshold value and a difference between the received power of the response request signal and the received power of each of the response request signals transmitted from other plurality of second wireless communication apparatuses is larger than a setting value, the communication control unit causes the transmitting unit to transmit the response signal to the one of the plurality second wireless communication apparatuses, wherein the communication control unit further causes the transmitting unit to transmit the response signal after the received power of the response request signal has fallen below the threshold value, wherein if the received power of the response request signal is on the increase and exceeds the threshold value and if the received power of the response request signal is on the decrease and falls below the threshold value, the communication control unit causes the transmitting unit to transmit the response signal, wherein the first wireless communication apparatus further comprises:
  a notifying unit;
    wherein the communication control unit controls communication for establishing a connection with the second wireless communication apparatus that has transmitted the response request signal after the transmitting unit has transmitted the response signal, and wherein when the establishment of a connection performed by the communication control unit is completed, the notifying unit notifies the establishment of communication.

2. The first wireless communication apparatus according to claim 1, further comprising:
  a display unit configured to display a screen for asking a user whether establishment of a connection is allowed before the communication control unit starts communication for establishing a connection.

3. The first wireless communication apparatus according to claim 1, wherein the communication control unit controls transmission of the response signal on the basis of the received power of the response request signal subjected to an averaging process.

4. A non-transitory computer readable storage medium, having stored thereon, a computer program having at least one code section executable by a computer, thereby causing the computer to perform the steps comprising:
  receiving a response request signal from each of a plurality of first wireless communication apparatuses;
  continuously measuring received power of the received response request signal;
  transmitting a response signal in response to the received response request signal, wherein the response signal is transmitted when a received power of the response request signal received from one of the plurality of first wireless communication apparatuses is higher than a threshold value and a difference between the received power of the response request signal received from the one of the plurality of first wireless communication apparatuses and received power of each of the response request signals received from other plurality of first wireless communication apparatuses is larger than a setting value, wherein the response signal is transmitted to the one of the plurality of first wireless communication apparatuses;
  controlling communication for establishing a connection with the one of the plurality of first wireless communication apparatuses that has transmitted the response request signal after the response signal has been transmitted; and
  notifying establishment of the connection when establishing the connection with the one of the plurality of first wireless communication apparatuses is completed.

5. A wireless communication method comprising:
  receiving a response request signal from each of a plurality of first wireless communication apparatuses;
  continuously measuring received power of the received response request signal; and
  transmitting a response signal in response to the received response request signal, wherein the response signal is transmitted when a received power of the response request signal received from one of the plurality of first wireless communication apparatuses is higher than a threshold value and a difference between the received power of the response request signal received from the one of the plurality of first wireless communication apparatuses and received power of each of the response request signals received from the other plurality of first wireless communication apparatuses is larger than a setting value, wherein the response signal is transmitted to the one of the plurality of first wireless communication apparatuses;
  controlling communication for establishing a connection with the one of the plurality of first wireless communication apparatuses that has transmitted the response request signal after the response signal has been transmitted; and
  notifying establishment of the connection when establishing the connection with the one of the plurality of first wireless communication apparatuses is completed.

6. The wireless communication method according to claim 5, further comprising transmitting the response signal after the received power of the response request signal falls below the threshold value.

7. The wireless communication method according to claim 5, further comprising transmitting the response signal when the received power of the response request signal is on the increase and exceeds the threshold value and when the received power of the response request signal is on the decrease and falls below the threshold value.

8. The wireless communication method according to claim 5, further comprising:
  displaying a screen for asking a user whether establishment of the connection is allowed before establishing the connection.

9. The wireless communication method according to claim 5, wherein the transmission of the response signal is controlled on the basis of the received power of the response request signal subjected to an averaging process.

10. A wireless communication system comprising:
  a plurality of first wireless communication apparatuses configured to intermittently transmit a response request signal; and
  a second wireless communication apparatus, the second wireless communication apparatus comprising:
    a receiving unit configured to receive the response request signal from each of the plurality of first wireless communication apparatuses;
    a transmitting unit configured to transmit a response signal to one of the plurality of first wireless communication apparatuses in response to the response request signal;
    a measuring unit configured to continuously measure received power of the response request signal received by the receiving unit; and
    a communication control unit configured to cause the transmitting unit to transmit the response signal to one of the plurality of first wireless communication apparatuses when the received power of the response request signal received from the one of the plurality of first wireless communication apparatuses is higher than a threshold value and a difference between the received power of the response request signal received from the one of the plurality of first wireless communication apparatuses and the received power of each of the response request signals transmitted from the other plurality of first wireless communication apparatuses is larger than a setting value, wherein the first wireless communication apparatus further comprises:

a notifying unit;

wherein the communication control unit controls communication for establishing a connection with the one of the plurality of first wireless communication apparatuses that has transmitted the response request signal after the transmitting unit has transmitted the response signal, and wherein when the establishment of a connection performed by the communication control unit is completed, the notifying unit notifies the establishment of communication.

11. The wireless communication system according to claim 10, wherein the response signal is transmitted after the received power of the response request signal has fallen below the threshold value.

12. The wireless communication system according to claim 10, wherein the response signal is transmitted if the received power of the response request signal is on the increase and exceeds the threshold value and if the received power of the response request signal is on the decrease and falls below the threshold value.

13. The wireless communication system according to claim 10, wherein the second wireless communication apparatus comprises a display screen to ask a user whether establishment of the connection is allowed before establishing the connection.

14. The wireless communication system according to claim 10, wherein the transmission of the response signal to the plurality of first wireless communication apparatuses is controlled on the basis of the received power of the response request signal subjected to an averaging process.

* * * * *